United States Patent
Van Boven et al.

(10) Patent No.: US 10,625,153 B2
(45) Date of Patent: Apr. 21, 2020

(54) LIGHTING FOR VIDEO GAMES

(71) Applicant: SIGNIFY HOLDING B.V., Eindhoven (NL)

(72) Inventors: Jacobus Dingenis Machiel Van Boven, Eindhoven (NL); Remco Magielse, Tilburg (NL); Dzmitry Viktorovich Aliakseyeu, Eindhoven (NL); Jonathan David Mason, Waalre (NL); Sanae Chraibi, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 101 days.

(21) Appl. No.: 15/752,286

(22) PCT Filed: Aug. 1, 2016

(86) PCT No.: PCT/EP2016/068283
§ 371 (c)(1),
(2) Date: Feb. 13, 2018

(87) PCT Pub. No.: WO2017/029103
PCT Pub. Date: Feb. 23, 2017

(65) Prior Publication Data
US 2018/0236354 A1     Aug. 23, 2018

(30) Foreign Application Priority Data
Aug. 20, 2015   (EP) .................... 15181697

(51) Int. Cl.
*A63F 13/28*   (2014.01)
*A63F 13/497*  (2014.01)
(Continued)

(52) U.S. Cl.
CPC .............. *A63F 13/28* (2014.09); *A63F 13/40* (2014.09); *A63F 13/497* (2014.09);
(Continued)

(58) Field of Classification Search
CPC ....................................................... G07F 17/32
See application file for complete search history.

(56) References Cited

U.S. PATENT DOCUMENTS

| | | | | |
|---|---|---|---|---|
| 4,691,920 A | * | 9/1987 | Murphy | A63F 7/0684 463/3 |
| 2004/0185936 A1 | * | 9/2004 | Block | G07F 17/32 463/42 |

(Continued)

FOREIGN PATENT DOCUMENTS

| | | |
|---|---|---|
| WO | 0240921 A2 | 5/2002 |
| WO | 2008065587 A2 | 6/2008 |
| WO | 2009031093 A1 | 3/2009 |

*Primary Examiner* — Kevin Y Kim
(74) *Attorney, Agent, or Firm* — Meenakshy Chakravorty

(57) ABSTRACT

A lighting controller for controlling illumination emitted by one or more luminaires to accompany a video game. When a first event occurs during gameplay, the controller receives an indication of an identified type of the first event from amongst a set of predefined event types, and based on this controls the illumination to produce a first lighting effect to accompany the first event during the gameplay phase. When a second event of the same type occurs in a non-gameplay phase of the video game, the controller receives an indication of this also. Based on identifying that the events are the same type, but that the video game is in the non-gameplay phase rather than the gameplay phase, the controller controls the illumination to produce a second lighting effect to accompany the occurrence of the second event during the non-gameplay phase, this effect being visibly distinct from the first lighting effect.

12 Claims, 3 Drawing Sheets

(51) Int. Cl.
*H05B 37/02* (2006.01)
*A63F 13/40* (2014.01)
*A63F 13/5252* (2014.01)

(52) U.S. Cl.
CPC ....... *H05B 37/029* (2013.01); *H05B 37/0245* (2013.01); *A63F 13/5252* (2014.09)

(56) References Cited

U.S. PATENT DOCUMENTS

2011/0118034 A1\* 5/2011 Jaffe .................. G07F 17/3211
463/42
2015/0009211 A1 1/2015 Jiang et al.
2015/0038215 A1 2/2015 Kim \* cited by examiner

LIGHTING FOR VIDEO GAMES

CROSS-REFERENCE TO PRIOR APPLICATIONS

This application is the U.S. National Phase application under 35 U.S.C. § 371 of International Application No. PCT/EP2016/068283, filed on Aug. 1, 2016, which claims the benefit of European Patent Application No. 15181697.2, filed on Aug. 20, 2015. These applications are hereby incorporated by reference herein.

TECHNICAL FIELD

The present disclosure relates to controlling the illumination emitted by one or more luminaires (e.g. room lighting) in order to accompany a video game.

BACKGROUND

Connected lighting systems are a class of lighting systems comprising networked illumination sources, preferably connected via a wireless network so that the illumination sources are wirelessly controllable. These illumination sources can be controlled from various user interfaces, such as smartphone and tablet applications, via internet services, or via connected physical devices such as sensors and switches. The behavior that can be assigned to a connected lighting system offers more opportunities than traditional lighting systems. For an end-user it is possible to specify how he wants his lighting system to behave. It is even possible to specify different forms of behavior at different moments in time. In other words the user is now able to use his or her lighting system not only for illumination or atmosphere creation but as a way to support or enhance any other activities happing in the home environment or online e.g. for entertainment, security, notifications, etc.

Thus connected lighting systems allow the lighting to add value beyond the domain of lighting alone. Additional functionality now becomes possible in other domains such as smart homes and entertainment. The latter can be divided in subdomains such as 'on screen content' (e.g. TV and movies), gaming and music. For instance, it is already known to add matching dynamic colored light around the television for watching TV and movies, which can be of great value to the viewer in that it creates a much more immersive viewing experience. Furthermore, connected lighting can also be used to enhance the gameplay of video games (computer games) such as console games, arcade games, or games played on desktop or laptop computers. Typical use cases focus on what effects the lamps render while the user is playing a game.

Within the domain of gaming, the lights of the Philips amBX for gaming kit are one example of an element in creating an immersive and engaging gaming experience. Now, with connected lighting systems, such as the Philips Hue system, these types of immersive experiences become within reach without the need to buy a dedicated entertainment lighting system. By connecting the lighting system to entertainment technology, the atmosphere and immersion into movies, TV series, games and music can be improved by providing dynamic colored lighting.

SUMMARY

Playing video games is highly engaging and may require a high level of concentration from the gamer, especially for fast-paced action games. This is something to be taken into account for game developers and others when designing light effects that accompany the game. Too dynamic, colorful, saturated and high intensity light effects will in many cases distract the gamer rather than increase the immersion into the game during gameplay.

However, gaming replays are different from regular gameplay in terms of concentration required from the player. They are an addition to video games that allow the gamer to enjoy specific parts of the gameplay again. E.g. they can be shown from both first and third person perspective. Often the level of detail, texture and lighting are increased to improve the viewing experience. Replays are more like watching a movie, with a lower level of concentration required than during actual gameplay. The light effects scripted normally for gameplay might therefor not be optimal for gaming replay. It would be desirable to maximize enjoyment and excitement during replay of video games even more with connected dynamic lighting, but without being overly distracting during actual gameplay.

The present disclosure provides an apparatus, system, method and computer program product which generate a second lighting effect or set of lighting effects as part of a replay, different from a first lighting effect set of lighting effects rendered during gameplay. The same can apply to unscripted vs. scripted events ("cut scenes"), or other gameplay vs. non-gameplay events.

According to one aspect disclosed herein, there is provided an apparatus comprising a lighting control device for controlling illumination emitted by one or more luminaires of a lighting system to accompany a video game played in an environment illuminated by the illumination from said one or more luminaires. The lighting controller is configured as follows. When a first event occurs as part of a gameplay phase of the video game, in which a player is playing the video game, the lighting controller identifies a type of the first event as being one of a set of predefined event types (in embodiments by receiving an indication of the identified type from the video game. Based on this identification that the first event is of said identified type, the lighting controller controls the illumination emitted by the one or more luminaires to produce a first lighting effect to accompany the first event during the gameplay phase. When a second event of a same one of said predefined types as the first event occurs as part of a non-gameplay phase of the video game, in which no player is playing the video game, the lighting controller identifies that the second event is of said same type (e.g. again bye receiving an identification of the identified type from the video game). Based on this identification that the second event is of the same one of said predefined event types as the first event, but that the video game is in the non-gameplay phase rather than the gameplay phase, the lighting controller controls the illumination emitted by the one or more luminaires to produce a second lighting effect to accompany the occurrence of the second event during the non-gameplay phase, wherein the second lighting effect is visibly distinct from the first lighting effect.

In embodiments, the non-gameplay phase may be a replay of at least a portion of the gameplay phase. For instance the second event may be a replayed version of the first event occurring within said replay.

Alternatively the non-gameplay phase may be a scripted cut scene.

In embodiments, the first and second events may both occur in a same virtual arena of the video game, and in the non-gameplay phase the virtual arena may be displayed from a different perspective than in the gameplay phase. For instance, in the gameplay phase the virtual arena may be displayed from a first person perspective and in the non-gameplay phase the virtual arena may be displayed from a third person perspective.

As an example, when a user crashes his or her car during gameplay then certain light effects related to the crash appear when the crash has occurred. As part of a replay of this, the light effects can be altered, such as to provide an earlier lead-up to the crash (e.g. as it is known the car will crash, to add to the excitement the lights start to dim towards the crash such that they appear brighter when the crash happens and the lights are fully turned on). E.g. as shown in the FIGS. 3a and 3b, the view provided to the player can be different for a replay (FIG. 3b) than for the gameplay (FIG. 3a)—this can be used to enhance the rendering of the light effect that was originally shown as part of the gameplay. As another example, as shown in FIGS. 2a and 2b, the number of lights involved or the intensity of the light effect can be enhanced during replay or during a scripted event (FIG. 2b) when no user input is required, relative to the gameplay itself (FIG. 2a)—the light effect can be maximized without worrying that it interferes with the gameplay.

In embodiments, the predefined event types may comprise any one or more of: an explosion, a gunshot, a fire, a crash between vehicles, a crash between at least one vehicle and another object (e.g. it surroundings), presence of an enemy, a player taking damage, a player increasing in health, a player inflicting damage, a player losing points, a player gaining points, a player reaching a finish line, a player completing a task, a player completing a level, a player completing a stage within a level, and/or a player achieving a high score. The identified type of the first and second event may comprise any one of said one or more event types, or others.

In embodiments, the second effect is produced beginning earlier in time relative to the second event in non-gameplay phase than the first effect is relative to the first event in the gameplay phase.

In embodiments, the second effect may comprise any one or more of: a higher intensity than the first effect, a different color than the first effect, a faster speed of flashing or pulsing than the first effect, a longer duration than the first effect, a less uniform spatial pattern than the first effect, and/or use of a greater number of the luminaires than the first effect.

Alternatively the second lighting effect may be the same as the first lighting effect, except that it begins earlier or later relative to the second event than the first effect begins relative to the first effect.

In embodiments, the receipt of said indications may comprise receiving the indication of the identified type of the second event in the form of a same event ID in a same message format as the indication of the identified type of the first event.

According to another aspect disclosed herein, there may be provided a system comprising the lighting controller apparatus (e.g. lighting bridge), the one or more luminaires, and the video gaming device; the lighting controller being operatively coupled to the video gaming device in order to receive said indications, and being operatively coupled to the luminaires in order to perform said control. The coupling may be by means of any wired and/or wireless connections (e.g. a wireless network).

According to another aspect disclosed herein, there is provided a computer program product for controlling illumination emitted by one or more luminaires of a lighting system to accompany a video game played in an environment illuminated by the illumination from said one or more luminaires; wherein the computer program product comprises code embodied on a computer-readable storage medium and configured so as when run on one or more control devices to perform operations of: when a first event occurs as part of a gameplay phase of the video game, in which a player is playing the video game, receiving an indication of an identified type of the first event wherein the identified type is one of a set of predefined event types; based on identifying that the first event is of said identified type, controlling the illumination emitted by the one or more luminaires to produce a first lighting effect to accompany the first event during the gameplay phase; when a second event of a same one of said predefined types as the first event occurs as part of a non-gameplay phase of the video game, in which no player is playing the video game, receiving an indication that the second event is of said same type; and based on identifying that the second event is of the same one of said predefined event types as the first event, but that the video game is in the non-gameplay phase rather than the gameplay phase, controlling the illumination emitted by the one or more luminaires to produce a second lighting effect to accompany the occurrence of the second event during the non-gameplay phase, wherein the second lighting effect is visibly distinct from the first lighting effect.

According to another aspect disclosed herein, there is provided a method of controlling illumination emitted by one or more luminaires of a lighting system to accompany a video game played in an environment illuminated by the illumination from said one or more luminaires; wherein the method comprises: when a first event occurs as part of a gameplay phase of the video game, in which a player is playing the video game, receiving an indication of an identified type of the first event wherein the identified type is one of a set of predefined event types; based on identifying that the first event is of said identified type, controlling the illumination emitted by the one or more luminaires to produce a first lighting effect to accompany the first event during the gameplay phase; when a second event of a same one of said predefined types as the first event occurs as part of a non-gameplay phase of the video game, in which no player is playing the video game, receiving an indication that the second event is of said same type; and based on identifying that the second event is of the same one of said predefined event types as the first event, but that the video game is in the non-gameplay phase rather than the gameplay phase, controlling the illumination emitted by the one or more luminaires to produce a second lighting effect to accompany the occurrence of the second event during the non-gameplay phase, wherein the second lighting effect is visibly distinct from the first lighting effect.

In embodiments the system, computer program product and/or method may be further configured in accordance with any of the features mentioned above or described elsewhere herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
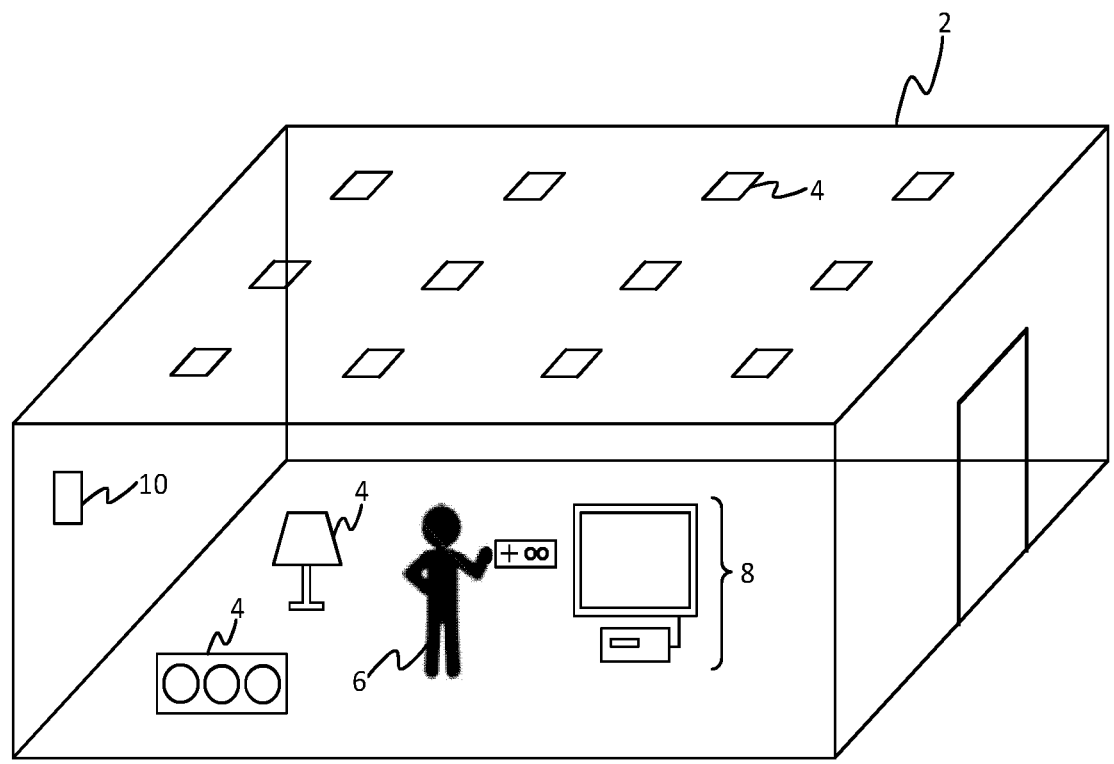
FIG. 1 is a schematic illustration of an environment in which one or more users are playing a video game.

FIG. 1 illustrates an environment 2 in which one or more players 6 are playing a video game on a video gaming device 8, such as a games console connected to an external screen (e.g. TV screen), a desktop or laptop computer (e.g. PC), or a dedicated arcade machine. Note that the environment here refers to the physical surroundings of the player(s) 6 in the world, i.e. an actual region of space, as opposed to the virtual arena of the video game. The environment 2 may comprise a room such as a room of a home, or of communal leisure facility such as video game arcade (where a "room" may be any internal division of a building such as a living room, dining room, bedroom, hall, concourse, etc.). Alternatively the environment 2 may comprise an outdoor space such as a garden or park, or a partially covered space such as a gazebo.

In addition to the video gaming device 8 including its screen(s) and user input device(s) (e.g. joypad or mouse, etc.), the environment 2 is additionally equipped with a connected lighting system comprising one or more luminaires 4 and a lighting controller 10 connected to control the luminaires 4. The luminaires 4 are illumination sources for illuminating the environment 2 in which the game 12 is being played. Each luminaire 4 comprises: at least one respective lamp (e.g. LED lamp, filament bulb or fluorescent tube); a wired or wireless communication interface for communicating with the controller 10; and any associated socket support, and/or housing. Each of the luminaires 4 may take any of a variety of forms, e.g. a ceiling mounted luminaire, a wall-mounted luminaire, a wall washer, or a free-standing luminaire (and the luminaires 4 need not necessarily all be of the same type).

The lighting control device 10 may implemented on a dedicated lighting bridge such as the Philips Hue bridge, or on any other suitable apparatus such as a general purpose user terminal (e.g. smartphone, tablet or laptop). As another example, some or all of the lighting controller 10 could be integrated into the gaming device 8 itself, or could be split between any two or more of the above devices and/or others. Wherever implemented, the lighting controller 10 may be implemented in the form of software stored on a memory of the relevant apparatus and arranged to run on a processor of that apparatus (the memory comprising one or memory devices and the processor comprising one or more processing units). Alternatively it is not excluded that the lighting controller may be implemented in the form of dedicated hardware circuitry, or configurable or reconfigurable hardware circuitry such as a PGA or FPGA, or any combination of hardware and software.

The lighting controller 10 and luminaires 4 form a lighting system, in which the lighting controller 10 and the one or more luminaires 4 are networked together into a local lighting network. That is, the lighting controller 10 is arranged to connect to each of the luminaires 4 by means of a wired or wireless connection. Preferably the local lighting network is a wireless network, with the lighting controller 10 being arranged to connect to the luminaires 4 by means of a wireless connection using a wireless access technology such as Wi-Fi, ZigBee or Bluetooth, or the like. Furthermore, the lighting controller 10 is arranged to connect to the gaming device 8, again by a wired or wireless connection, and preferably a wireless connection such as Wi-Fi, ZigBee, Bluetooth or the like. The gaming device 8 may connect to the lighting controller 10 as part of the same lighting network as the luminaires 4, or by a separate channel. The various interactions described herein between the lighting controller 10, luminaires 4 and video gaming device 8 may be conducted via any of the above means or others, and for brevity the means of connection will not be repeated each time.

The lighting controller 10 is configured to recognize one or more predefined types of event that can occur during video games, and preferably is configured to recognize a set of multiple such event types. That is, the lighting controller 10 comprises a database recording a set of identifiers (IDs) such as numerical or alphanumeric ID codes, the set comprising a respective one of the IDs for each of the different predefined event types. Alternatively the database could be stored elsewhere, e.g. on a server, and accessed by the lighting controller 10 over a network such as the Internet. For instance the database may be maintained centrally on a server hosted on the Internet, and the lighting controller 10 may be configured to download an instance of the database (or a portion of it) from the server via the Internet. Note that a server herein refers to a logical entity that may comprise one or more server units at one or more geographical sites.

A non-exhaustive list of possible types of event that may occur in a video game is as follows, and in embodiments the set of predefined event types recognized by the lighting controller may comprise any one or more of these: an explosion, a gunshot, a fire, a crash between vehicles, a crash between at least one vehicle and another object (e.g. its surroundings in the video game), presence of an enemy, a player taking damage, a player increasing in health, a player inflicting damage, a player losing points, a player gaining points, a player reaching a finish line, a player completing a task, a player completing a level, a player completing a stage within a level, and/or a player achieving a high score.

Furthermore, the database stored at (or accessed by) the lighting controller 10 also comprises a definition of a respective lighting effect mapped to each of a plurality of the different event types. Each lighting effects may be defined in terms of any one or more of: a particular color of lighting; a particular intensity of lighting; a particular spatial pattern of lighting to be rendered over a plurality of luminaires 4; a start time, duration and/or end time of the effect; and/or a dynamic lighting pattern (e.g. flashing or pulsing, perhaps specifying a particular speed and/or depth of variation, or a time-varying spatial pattern).

The video gaming device 8 is arranged to run at least one game application, which presents the user (player) with a video game that he or she can play (or which multiple players can play). During the gameplay of the game, the player has control of at least one virtual object (sometimes referred to as a "sprite") within the game. Typically this virtual object is a character such as a person, animal or anthropomorphized object; or may also be a vehicle such as a car in a racing game, or a spaceship. The virtual object or objects could also take other forms, such tiles in a construction or empire building game. The one or more virtual objects controlled by the player during gameplay are controlled within a virtual arena, i.e. a virtual setting in which game events occur and actions are carried out in the game ("arena" being used in its general sense to mean any place in which activity is carried out). The control the player exerts during gameplay comprises moving the one or more virtual objects within the virtual arena, and/or causing the one or more virtual objects to interact with the virtual arena (e.g. talk to another character in the virtual arena, pick up an item in the virtual arena, change a parameter of some item or aspect of the virtual arena, etc.).

As well as the actual gameplay of the video game, the video game 8 also comprises at least one non-gameplay phase in which the player does not have control of any of the game, i.e. does not have control of any character or other such virtual objects within the virtual arena of the game (though the player may still have control of other peripheral aspects outside the actual playing of the game, such as to quit the game application, or summon a settings menu for changing settings such as volume, gamma correction, or the like). For example the non-gameplay phase may comprise a replay phase in which the user replays a previous phase of the gameplay (many game applications enable a user a user may record him or herself, to play back later for his or her own amusement, or to show friends). As another example, the non-gameplay phase may comprise a scripted cut scene, in which the user simply watches a pre-recorded, deterministic animation or movie scene (similar to watching a cartoon, TV show or film) that furthers the story of the game but does not actually involve the user interacting with the game in any way.

During the gameplay phase or the non-gameplay phase, various ones of the different event types may occur, and the same types of event may tend to occur in the different phases. Indeed in a replay, a replayed instance of some or all of the same events experienced during gameplay will be repeated.

In the gameplay phase the events may be triggered by the action of the player, or another player, or an artificial intelligence (AI) character or engine. In the non-gameplay phase, the events occur at predetermined times within that phase, e.g. at a pre-recorded time in the replay, or a pre-scripted time in the cut scene.

When any such event occurs during either the gameplay phase or non-gameplay phase, the video game application running on the gaming device 8 is configured to output an ID of the identified type to the lighting controller 10 in real time, i.e. as-and-when it happens. The lighting controller is configured to look up the ID of the event type in its database of lighting effects, and based thereon to control the luminaires 4 to render the corresponding lighting effect to accompany. Thus based on the ID received from the game application 8 on the gaming device, the lighting controller is able to itself identify the type of the event and adapt its behavior based on this.

Further, in accordance with embodiments disclosed herein, whenever one of the predefined types of occurs during the gameplay phase or non-gameplay phase, the game application is also configured to output to the lighting controller 10, in real-time, an indication of whether the game is in a gameplay phase or non-gameplay phase at the time of the event in question. In addition, the lighting controller 10 is configured to use this indication to select a different variant of the lighting effect for a given event type depending on whether the event occurred in the gameplay phase or non-gameplay phase. Thus whenever any event of a given type occurs during a gameplay phase of the game, then a first effect rendered; and whenever any event of the same type occurs during a non-gameplay event, then a second effect is rendered that is visibly distinct to the player compared to the first effect. Preferably this is the case for each of the different event types in the database (or at least each of a plurality of the different event types), i.e. each event type is mapped to a corresponding pair of effect definitions, one for the gameplay mode and one for the non-gameplay mode.

Figure 2A:
FIG. 2a is a schematic illustration of a lighting effect accompanying an explosion event during playing of an action game.
Figure 2B:
FIG. 2b is a schematic illustration of a lighting effect accompanying an explosion event in the action game of FIG. 2a, but during a replay or scripted part of the game.

For instance, this can be used so that a more intense or colorful lighting effect is rendered during a replay or cut scene, when the player's attention is less crucial, than during gameplay when the user should preferably not be distracted so much. For example see FIGS. 2a and 2b. FIG. 2a shows an event in the form of an in-game explosion occurring during gameplay, accompanied by a lower intensity lighting effect output over fewer of the available luminaires 4; while FIG. 2b shows the same event or type of event occurring during replay or a scripted event (cut scene), wherein here the same type of event is accompanied by a higher intensity effect output over a larger number of luminaires 4.

In another particularly advantageous embodiment, in a replay mode a lighting effect is (at least partially) rendered before the occurrence of the event that had caused the rendering of the original light effect in play mode, earlier than it would have been during gameplay. Example: before an explosion occurs on-screen in replay mode, the luminaires 4 are dimmed such that when the explosion light effect is rendered it has more impact. Alternatively the replay or scripted version of an effect could be later in time than its gameplay counterpart.

In embodiments, for each given event type, the effect database maps the same ID to the event type for both the gameplay phase and the non-gameplay phase. I.e. whenever an event of a given type (e.g. an explosion) occurs in the gameplay phase, the game application outputs a respective corresponding ID to the lighting controller 10; and whenever an event of the same type occurs within the non-gameplay phase, the game application outputs the same ID to the lighting controller 10. The lighting controller then differentiates as to which variant of the lighting effect to select based on a separate indication received from the video game application in conjunction with the ID as to whether the event occurred in the gameplay phase or non-gameplay phase, e.g. a flag specifying whether it was during gameplay or not, or an indicator explicitly stating that the event occurred in replay mode, or cut scene mode, or the like.

Alternatively it is possible that the gameplay and non-gameplay variants of a given effect for a given event are signaled and addressed by different IDs, but the two different effects are nonetheless categorized together in the database of the lighting controller 10, perhaps also mapped together to the same human-readable event name (e.g. "explosion", "crash", etc.) so that developers of the game and/or lighting effects can readily make use of the database.

In embodiments, for a given event type, the two effects for the gameplay phase and non-gameplay phase may be created separately by the party who defines the lighting effects in the database of the lighting controller 10, and may be defined in the database by means of two separately renderable lighting scene definitions. Alternatively the non-gameplay effect could be defined in the database in terms of a modifier which the lighting controller 10 will apply to the definition of the gameplay version, or vice versa (e.g. increase intensity by 30% and increase pulse rate by 50%, or multiply the color and intensity values by a certain matrix multiplier, or such like).

Note that the event type refers to a category of event, not just a specific instance of an event. Thus, the same event type can be re-used multiple times in the same game and/or in different games. In embodiments, the same scheme of IDs may be used across multiple different video games (multiple different titles), and even multiple different developers. Alternatively each of a plurality of different developers or even each video game title may have its own respective set of event IDs and effects stored in the database of the lighting controller 10.

In embodiments, the effect events of a given type may be invoked by the developer of the video game using a common schema or protocol made available to video game developers for identifying types of event from amongst the predefined set. Firstly, whenever an event of a given type occurs within either of the gameplay phase or non-gameplay phase, the game application outputs a message to the lighting controller 10 having the same format, such as:

MESSAGE (message_type=event, event_type=ID, phase=flag)

Thus the indication received by the lighting controller 10 to identify that one event of a given type is of a same format as the identification received to identify first event, e.g. with the same fields and event ID and only a different value of the gameplay phase flag. Similarly, events of different types, whether in the gameplay phase or the non-gameplay phase, may all be signaled from the game application to lighting controller 10 the using a common format of message.

Alternatively or additionally, the code of the video game application may invoke the sending of such a message by means of a commonly formatted portion of code, e.g. a common format of instruction or function call, for both the events occurring the gameplay phase and non-gameplay phase. I.e. it may include a commonly form in terms of the line or lines of code used to invoke the sending of a given event type, or event different event type, from amongst the predefined set of available event types, regardless of whether in a gameplay phase or non-gameplay phase. E.g. in pseudocode:

OUTPUT addr_lighting_cont=ADDR, event_type=ID, phase=flag or

OUTPUT addr_lighting_cont=ADDR, event_type( ), phase( )

where event_type( ) is a function or object that gets the current value of the event type and phase( ) is a function or object that gets the current value of the phase (gameplay or non-gameplay). A combination of the two approaches above could also be used (e.g. only getting the phase and explicitly specifying the event ID). In the latter examples, the lines of code invoking the lighting effect for a given event type could even be identical for the gameplay and non-gameplay phase, or even for different event types.

Preferably, a software development tool may be provided to game developers to help them more easily integrate light effects in the environment around the players. E.g. this tool may comprise a library, enabling the developer simply invokes a function or object such as Lighting_effect( ) or Lighting_effect(event_type) in the source code. The function or object then automatically gets the values of the current phase and/or event type, and automatically outputs the corresponding message signaling the event to the address of the lighting controller 10.

The software development tool may also provide developers of video games and/or developers of lighting scenes to access the database of lighting effects and script their own effects. E.g. these could be submitted to and stored at a centrally maintained database stored on a server on the Internet, and the lighting controller 10 downloads or otherwise accesses this database (or part of it) to obtain the rules it requires to render the relevant lighting effects for the video game in question.

Thus according to the various embodiments discussed above, there is provided a method to maximize user's experience while playing a video game without undue distraction, by selectively enhancing the light effects during non-played moments like replays, scripted game events, etc. Some example implementations are as follows.

The lighting effects designed for application during gameplay are rendered in any replay scene with higher level of intensity, where intensity can be one or the combination of the following: increased saturation of colors used, higher brightness, more dynamic effects (e.g. faster color/brightness transitions), bigger size of the effect (e.g. more lamps/luminaries play effect), richer details and fluctuations of the light effect (e.g. fading and transitions), etc.

The parameters of certain effects may vary from in-game use to replay use.

Functions of the light during in-game use may vary or lessen during the replay to assist with dramatization e.g. spatial cues on the direction of the enemy may be lessened as this will reduce the feeling of suspense during the replay.

The invention may describe an additional replay-engine that can take the gameplay lighting scene and adjust it specifically for replay.

One particular example application of the disclosed techniques is in relation to a replay mode. A Replay mode allows the gamer to choose either to experience the additional effects or not. The gamer can do this for example either in a popup before the start of each replay, or tick the option 'replay mode on' in the general settings of the game or console. In advanced settings, the game can adjust the level to which intensity and saturation of the lights are increased during replay mode, as preferences do differ per person.

Replay mode allows game developers to script effects specifically for this mode. Depending on the game, dedicated effects can be scripted such as 'celebration experiences' (e.g. when finishing in racing games, performing high scores) or increased intensity, color and/or saturation of the light. Even additional light effects can be scripted that are not triggered during gameplay. These additional effects can be mapped on the lights used during gameplay or onto additional lights normally not contributing to the lighting experience during gameplay (as these might distract from the gameplay).

Figure 3A:
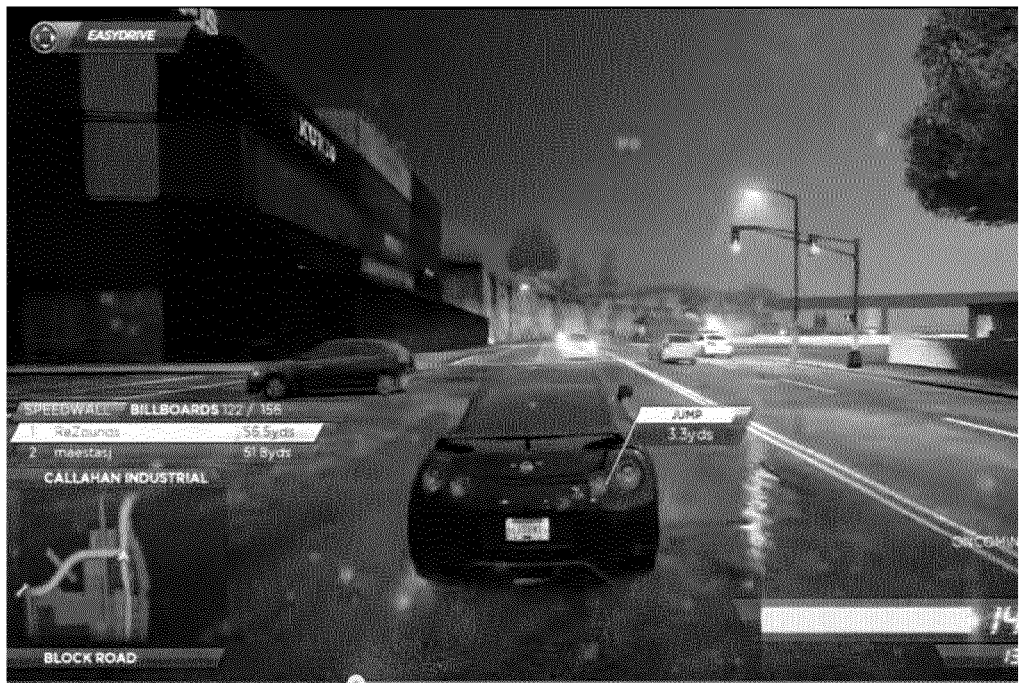
FIG. 3a is a schematic illustration of a view seen by a player in a driving game while playing the game.
Figure 3B:
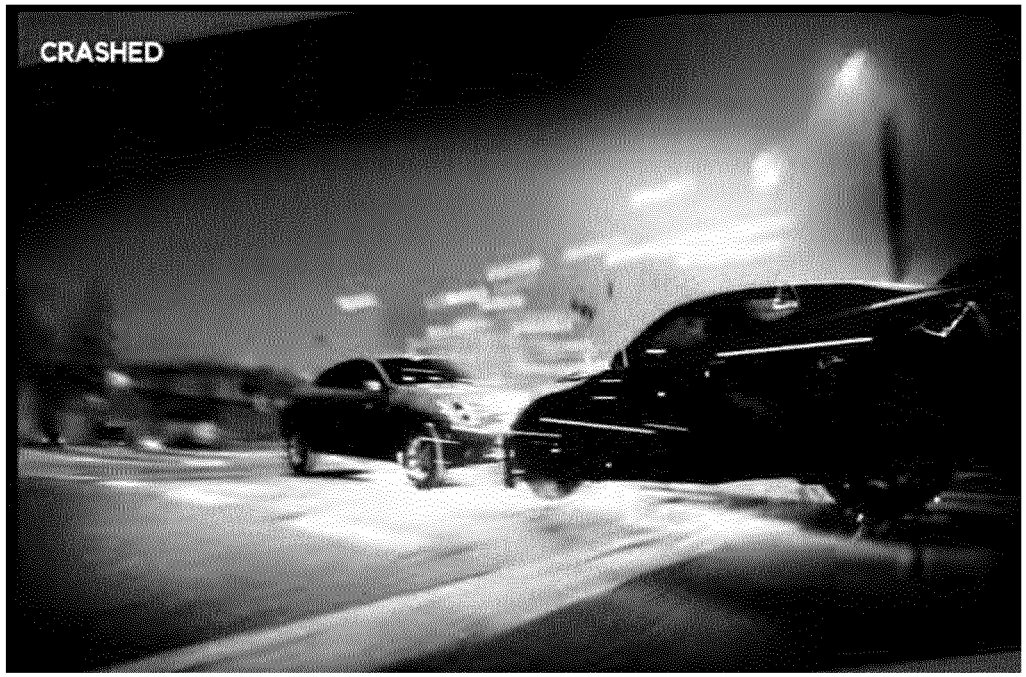
FIG. 3b is a schematic illustration of a crash event occurring in the driving game of FIG. 3a, as seen during a replay or scripted part of the game.

Replay mode can result in similar in game events (such as pickups, bounces, firing and hits) triggering different lighting effects during gameplay compared to game replay. Note that the replay mode may however (in some cases) display the same events from a different perspective than in the gameplay phase it is replaying, e.g. from a third person perspective instead of first person, of from a more side-on or top-down view in replay vs. a rear view during gameplay. For instance see FIGS. 3*a* and 3*b*, where FIG. 3*a* shows a view of car in a driving game during gameplay, while FIG. 3*b* shows a crash replay of an event in which the player crashes the car. This is seen from a different (more side-on) point of view than for the same event during gameplay. The player does not have control at this moment.

For the gamer, by selecting replay mode, the luminaires 4 that link to the gamers gaming lighting system will run the scripted replay mode lighting effects.

For the developer, replay mode is a separate part within a general light game scripting tool. It allows developers to script the light effects that are rendered during game replay. As a basis the scripted light effects during gameplay can be used, in which intensity and saturation of the standard (during gameplay) light effects can be changed or to which additional light effects can be added.

Here is an example of a replay mode experience. Rick has just had his best first person shooter gameplay ever. His Philips Hue lights supporting just perfectly added subtle light effects, just as he likes it, providing just the right atmosphere during gaming. Rick can't wait to show the replay of the game to his friends Carl and Kevin. Therefore Rick goes to the game menu and in the Hue settings tab selects replay mode. When his friends arrive Rick tells them about his great experience and shows them his replay from a third person perspective. The extra light effects that accompany the game now make this even a more astonishing experience blowing the minds of Rick's friends . . . and Rick feels the thrill of the play almost even more than while playing.

Another particular application of the disclosed techniques can be found in relation to scripted events (or "cut scenes"). Similarly to replays, scripted events in games are triggered by a particular action of the user but when triggered user does not have control over it and can only observe. Unlike the replay, scripted events are not a repetition of some user action, so simply intensifying the light effects as in replay case would not work. However, it is expected that games would use a set of predefined light effects to be triggered during normal gameplay e.g. explosion, fire, gunshot, transition to other environment etc. in this case if any of the events that has an associated light effect happens during scripted event, this lighting effect can be "enhanced" in the similar fashion as described in the replay embodiment. For example if light effect of explosion during the gameplay is only rendered using one lamp during the scripted event all lamps could play it to intensify the impact on the user.

On a further point, note that while in many examples, such as those discussed above, the effect rendered to accompany a replay or cut-scene event is a variant of the same effect rendered to accompany the same type of event during gameplay, this does not necessarily need to be the case in all possible embodiments. Alternatively the replay or cut-scene effect could be completely different and/or defined independently from the corresponding gameplay effect.

As one example, the effect for a given event during gameplay may be to render an ostensible foreground effect such as a bright flash, whereas the effect for the same event during the replay phase may be to continue rendering a general background effect that continues throughout the game (or at least a present portion of it). For instance, the user plays an adventure game, and the system only renders a foreground effect when the player gets a power up, or a boost, whereas in the replay mode then for the same event(s) the system simply continues to render a general atmosphere of the surroundings that the player travels through. Or as another illustration of this idea, say the player plays a shooting game and the lights flicker in accordance with his or health; but when the player watches a replay of the same level or portion of the game, he or she only gets atmospheric lighting & explosions, not the flickering. In such cases, the database of the lighting controller 10 may record, against a given event type ID or category, an effect definition specifying that it should continue rending the background effect (i.e. an indication amounting to "no extra effect", or a modifier specifying "in gameplay mode but not replay mode", or versa). Thus in response to receiving an indication from the game application that one such type of event has occurred during replay, the lighting controller 10 will look this up in the database and determine that the appropriate effect is to continue rendering the background lighting effect rather than adding an additional, ostensible effect on top of that; whereas for the same event type being signaled in gameplay mode, it would render such an additional effect.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus comprising a lighting control device for controlling illumination emitted by one or more luminaires of a lighting system to accompany a video game played in an environment illuminated by said one or more luminaires, the lighting controller being configured to perform operations of:
   when a first event occurs as part of a gameplay phase of the video game, in which a player is playing the video game and can exert control within the video game, identifying a type for association with the first event, the type being chosen from a set of predefined event types;
   based on the type identified for association with the first event, controlling the illumination emitted by the one or more luminaires to produce a first lighting effect to accompany the first event during the gameplay phase;
   when a second event of a same one of said predefined types as the first event occurs as part of a non-gameplay phase of the video game, in which the player does not have said control within the video game and no player is playing the video game, identifying that the second event is of said same type; and
   based on said identification that the second event is of the same one of said predefined event types as the first event, but that the video game is in the non-gameplay phase rather than the gameplay phase, controlling the illumination emitted by the one or more luminaires to produce a second lighting effect to accompany the occurrence of the second event during the non-gameplay phase, wherein the second lighting effect is visibly distinct from the first lighting effect.

2. The apparatus of claim 1, wherein the non-gameplay phase is a replay of at least a portion of the gameplay phase.

3. The apparatus of claim 2, wherein the second event is a replayed version of the first event occurring within said replay.

4. The apparatus of claim 1, wherein the non-gameplay phase is a scripted cut scene.

5. The apparatus of claim 1, wherein the first and second events both occur in a same virtual arena of the video game, and wherein in the non-gameplay phase the virtual arena is displayed from a different perspective than in the gameplay phase.

6. The apparatus of claim 5, wherein in the gameplay phase the arena is displayed from a first person perspective and in the non-gameplay phase the virtual arena is displayed from a third person perspective.

7. The apparatus of claim 1, wherein the predefined event types comprise any one or more of:

an explosion,
a gunshot,
a fire,
a crash between vehicles,
a crash between at least one vehicle and another object
presence of an enemy,
a player taking damage,
a player increasing in health,
a player inflicting damage,
a player losing points,
a player gaining points,
a player reaching a finish line,
a player completing a task,
a player completing a level,
a player completing a stage within a level, and/or
a player achieving a high score; and
wherein the identified type of the first and second event comprises one of said one or more event types.

8. The apparatus of claim 1, wherein the second effect starts earlier in time relative to the second event in non-gameplay phase, as compared to the first effect's start relative to the first event in the gameplay phase.

9. The apparatus of claim 1, wherein the second effect comprises any one or more of:
a higher intensity than the first effect,
a different color than the first effect,
a faster speed of flashing or pulsing than the first effect,
a longer duration than the first effect,
a less uniform spatial pattern than the first effect, and/or
use of a greater number of the luminaires than the first effect.

10. A lighting system comprising:
one or more luminaires;
a video gaming device; and
an apparatus comprising a lighting control device for controlling illumination emitted by the one or more luminaires to accompany a video game played in an environment illuminated by said one or more luminaires, the lighting control device being configured to perform operations of:
  when a first event occurs as part of a gameplay phase of the video game, in which a player is playing the video game and can exert control within the video game, identifying a type for association with the first event, the type being chosen from a set of predefined event types;
  based on the type identified for association with the first event, controlling the illumination emitted by the one or more luminaires to produce a first lighting effect to accompany the first event during the gameplay phase;
  when a second event of a same one of said predefined types as the first event occurs as part of a non-gameplay phase of the video game, in which the player does not have said control within the video game and no player is playing the video game, identifying that the second event is of said same type; and
  based on said identification that the second event is of the same one of said predefined event types as the first event, but that the video game is in the non-gameplay phase rather than the gameplay phase, controlling the illumination emitted by the one or more luminaires to produce a second lighting effect to accompany the occurrence of the second event during the non-gameplay phase, wherein the second lighting effect is visibly distinct from the first lighting effect.

11. A computer program product for controlling illumination emitted by one or more luminaires of a lighting system to accompany a video game played in an environment illuminated by said one or more luminaires; wherein the computer program product comprises code embodied on a computer-readable storage medium and configured so as when run on one or more control devices to perform operations of:
  when a first event occurs as part of a gameplay phase of the video game, in which a player is playing the video game and can exert control within the video game, identifying a type for association with the first event, the type being chosen from a set of predefined event types;
  based on the type identified for association with the first event, controlling the illumination emitted by the one or more luminaires to produce a first lighting effect to accompany the first event during the gameplay phase;
  when a second event of a same one of said predefined types as the first event occurs as part of a non-gameplay phase of the video game, in which the player does not have said control within the video game and no player is playing the video game, identifying that the second event is of said same type; and
  based on said identification that the second event is of the same one of said predefined event types as the first event, but that the video game is in the non-gameplay phase rather than the gameplay phase, controlling the illumination emitted by the one or more luminaires to produce a second lighting effect to accompany the occurrence of the second event during the non-gameplay phase, wherein the second lighting effect is visibly distinct from the first lighting effect.

12. A method of controlling illumination emitted by one or more luminaires of a lighting system to accompany a video game played in an environment illuminated by said one or more luminaires, the method comprising:
  when a first event occurs as part of a gameplay phase of the video game, in which a player is playing the video game and can exert control within the video game, identifying a type for association with the first event, the type being chosen from a set of predefined event types;
  based on the type identified for association with the first event, controlling the illumination emitted by the one or more luminaires to produce a first lighting effect to accompany the first event during the gameplay phase;
  when a second event of a same one of said predefined types as the first event occurs as part of a non-gameplay phase of the video game, in which the player does not have said control within the video game and no player is playing the video game, identifying that the second event is of said same type; and
  based on said identification that the second event is of the same one of said predefined event types as the first event, but that the video game is in the non-gameplay phase rather than the gameplay phase, controlling the illumination emitted by the one or more luminaires to produce a second lighting effect to accompany the occurrence of the second event during the non-gameplay phase, wherein the second lighting effect is visibly distinct from the first lighting effect.

* * * * *